United States Patent [19]

Horie et al.

[11] Patent Number: 4,659,796

[45] Date of Patent: Apr. 21, 1987

[54] AMINE-MODIFIED WAX

[75] Inventors: Shinji Horie; Tetsuji Kakizaki, both of Mie, Japan

[73] Assignee: Mitsubishi Petrochemical Co., Ltd., Tokyo, Japan

[21] Appl. No.: 885,440

[22] Filed: Jul. 14, 1986

Related U.S. Application Data

[63] Continuation-in-part of Ser. No. 712,654, Mar. 18, 1985.

[30] Foreign Application Priority Data

Mar. 28, 1984 [JP] Japan .................................. 59-60142

[51] Int. Cl.$^4$ ............................................ C08F 255/02
[52] U.S. Cl. ................................... 526/310; 106/270; 525/279; 525/293; 526/263
[58] Field of Search ................. 106/270; 525/279, 293, 525/296; 526/310, 263

[56] References Cited

U.S. PATENT DOCUMENTS

| | | | |
|---|---|---|---|
| 3,235,503 | 2/1966 | de Vries | 525/293 |
| 3,475,393 | 10/1969 | Lorensen | 525/279 |
| 3,953,541 | 4/1976 | Fuji | 525/293 |
| 4,051,050 | 9/1977 | Elliott | 525/293 |

Primary Examiner—Paul R. Michl
Attorney, Agent, or Firm—Oblon, Fisher, Spivak, McClelland & Maier

[57] ABSTRACT

An amine-modified homogeneous wax having an excellent homogeneity is disclosed, comprising 60 to 100% by weight of an unoxidized wax, at least partially grafted with a tertiary amine unit-containing vinyl monomer, and 40 to 0% by weight of a polymer of the tertiary amine unit-containing vinyl monomer, the total amount of the tertiary amine unit-containing vinyl monomer in the composition being 0.3 to 40% by weight.

15 Claims, No Drawings

AMINE-MODIFIED WAX

CROSS REFERENCE TO THE RELATED APPLICATION

This application is continuation-in-part application of Ser. No. 712,654, filed Mar. 18, 1985 entitled "Amine-modified wax", now pending.

FIELD OF THE INVENTION

This invention relates to an amine-modified wax having an excellent homogeneity.

BACKGROUND OF THE INVENTION

Waxes generally have a number average molecular weight in the range of about 300 to 10,000, and are either naturally-occurring or synthetic. Because of their low molecular weights, those waxes have a low melting point, a low melt viscosity, a high compatibility with various solvents and resins, and an excellent workability, e.g., impregnating performance, castability, continuous processing performance, etc. Accordingly, those waxes can be applied in a broad range, for example, as coatings, printing ink, adhesives, plastics processing additives, textile treating agents, pigment dispersants, processing auxiliaries for ceramics and other inorganic products, plasticizers, and so forth. However, since they do not have a polarity, those waxes have the disadvantage of limited functional qualities.

On the other hand, tertiary amine unit-containing polymers, unlike waxes, have a high polarity and due to the ionic characteristics of the tertiary amine unit, can be applied in a broad range, e.g., ionic bonding adhesives, dispersants, flocculents, binders for gamma-iron oxide powder and other inorganics, polymeric electrolytes, adsorbents, and so forth.

If such a resin having these divergent properties was discovered, it would be of great utility and will find application in a broad variety of uses. Therefore, development of such a resin material has heretofore been desired.

However, because of the poor compatibility of these two kinds of resins, even if both resins are merely blended, a finely dispersed homogeneous composition cannot be obtained.

SUMMARY OF THE INVENTION

Under the circumstances, as a result of extensive investigations to develop such a useful resin composition, it has been found that a graft-modified wax containing a specified amount of a tertiary amine unit-containing vinyl monomer or an amine-modified wax composition comprising such a graft-modified wax and a polymer of the tertiary amine unit-containing vinyl monomer is a homogeneous composition composed of finely divided mutually-compatible particles and that such a composition is useful as a solubilizing agent for a system comprising a wax and a polymer of amine unit-containing vinyl monomer. This invention has been completed on the basis of the above findings.

Accordingly, an object of the present invention is to provide an amine-modified homogeneous wax comprising 60 to 100% by weight of an unoxidized olefinic wax, at least partially grafted with a tertiary amine unit-containing vinyl monomer, and 40 to 0% by weight of a polymer of the tertiary amine unit-containing vinyl monomer, the total amount of the tertiary amine unit containing vinyl monomer in the composition being 0.3 to 40% by weight.

The amine-modified wax according to this invention is not only useful as such in the above-described applications but exhibits an excellent effect to improve the compatibility of wax with tertiary amine unit-containing polymers.

DETAILED DESCRIPTION OF THE INVENTION

The unoxidized olefinic wax which can be used in this invention can be any conventional waxes, regardless of naturally-occurring wax or synthetic wax. Of those waxes, a polyethylene wax is preferred from the standpoint of the homogeneity.

The wax has a number-average molecular weight of 800 to 6,000.

A polyethylene waxes having a number-average molecular weight of 900 to 5,000 is preferred from the standpoints of the homogeneity and also the melt viscosity in the subsequent modification reaction.

Moreover, form the standpoint of the homogeneity, the ratio of weight-average molecular weight to number-average molecular weight of the wax is preferably at least 1.05:1, most preferably at least 1.15:1.

Different types of waxes may be blended and used so long as the above parameters are within the specified ranges and the homogeneity is not lost.

The tertiary amine unit-containing vinyl monomer that can be used in this invention is one which forms a polymer by polymerization thereof using a radical generator. Any tertiary amine unit-containing vinyl monomer which meets the above requirement can be employed. A representative example of the vinyl monomer is a monomer of the general formula:

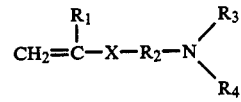

wherein $R_1$ is a hydrogen atom or a lower alkyl group; $R_2$ is a lower alkylene group; $R_3$ and $R_4$ are each a lower alkyl group or an aryl group; and X is a linking group to the unsaturated carbon atom. At least one tertiary amine unit should be present in the monomer. Heterocyclic compounds having a tertiary amine unit may also be employed. Other examples of the vinyl monomer include N,N-dimethylaminoethyl methacrylate, N,N-diethylaminoethyl methacrylate, N-ethyl-N-phenylaminoethyl methacrylate, N,N-dimethylaminopropyl methacrylamide, N,N-diethylaminopropyl methacrylamide, N,N-dimethylaminoethyl methacrylamide, N,N-diethylaminoethyl methacrylamide, vinylpyridine, vinyl piperidine, etc.

These monomers (main monomers) may be used in admixture with other monomers (comonomers) such as styrene, acrylic acid, acrylonitrile, acrylic acid esters, methacrylic acid esters, vinyl acetate, etc. The amount of the comonomers should not exceed that of the main monomers. Of course, additional components such as stabilizers, dispersing agents, colorants, etc. may be added.

In preparing a wax graft-modified with a tertiary amine unit-containing vinyl monomer or a polymer of such monomer, a radical initiator is used. The radical initiator by which reactions different from the reaction of a vinyl group in the vinyl monomer occur is not preferred. Therefore, the radical initiator which does not generate a carboxyl radical is preferred. If a compound which generates a carboxyl radical is used, it undergoes complicated reactions with the vinyl monomer to cause severe coloration, thereby losing the commercial value of the product. Moreover, the modified wax thus produced has a poor homogeneity. The reaction temperature is generally 150° C. or less and preferably 135° C. or less. Therefore, the radical initiator having a decomposition temperature of from 60° C. to 120° C. is preferred.

The term "decomposition temperature" as used herein means the temperature at which the decomposition percentage of the radical initiator reaches 50% when 0.1 mole of the radical initiator is added to 1 l of benzene and the mixture is allowed to stand at a given temperature for 10 hours.

Examples of the radical initiator include organic peroxides such as cyclohexanone peroxide (97° C.), 1,1-bis(t-butylperoxy)3,3,5-trimethylcyclohexane (91° C.), 1,1-bis(t-butylperoxy)cyclohexane (91° C.), 2,2-bis(t-butylperoxy)butane (103° C.), dicumyl peroxide (117° C.), 2,5-dimethyl-2,5-di(t-butylperoxy)hexane (118° C.), $\alpha,\alpha'$-bis(t-butylperoxyisopropyl)benzene (113° C.), etc. and azo compounds such as azobisisobutyronitrile (65° C.), azobis(2,4-dimethyl(valeronitrile)) (68° C.), 2-t-butylazo-2-cyano-4-methoxy-4-methylpentane (55° C.), 2-t-butylazo-2-cyano-4-methylpentane (70° C.), 2-t-butylazo-2-cyanopropane (79° C.), 2-t-butylazo-2-cyanobutane (82° C.), 1-t-butylazo-1-cyanocyclohexane (96° C.), 1-t-aminoazo-1-cyanocyclohexane (94° C.), etc. In the above compounds, figures in parentheses denote the decomposition temperature of the compounds. Of the above-described compounds, organic peroxides and azo compounds having a decomposition temperature of 100° C. or less are preferred, and from the standpoint of the reactivity, the azo compounds are particularly preferred.

The radical initiator is used in an amount of 0.01 mole or more, preferably 0.1 to 1.2 moles, and most preferably 0.15 to 0.9 mole, per mole of the vinyl monomer. If the amount used thereof is outside the above range, it is difficult to control the molecular weight of the modified product so that a homogeneous composition cannot be obtained.

In the process of graft reacting the tertiary amine unit-containing vinyl monomer onto the wax in the presence of the radical initiator, the vinyl monomer and the radical initiator can be added in any procedures so long as the occurrence of abnormal reactions can be prevented. For example, the radical initiator is dissolved in the vinyl monomer or a solvent and the resulting solution is added to the wax at once, continuously at a constant rate or intermittently. The radical initiator and the vinyl monomer may be independently added. The rate of addition may be controlled to improve degree of grafting. In this case, it is preferred that the vinyl monomer be fed at a rate of $2 \times 10^{-3}$ to $5 \times 10^2$ moles/hr per kg of the wax and the radical initiator be fed at a rate of $2 \times 10^{-4}$ to $5 \times 10^2$ moles/hr per kg of the wax.

The graft reaction is preferably conducted in a nonaqueous system. If the reaction is conducted in an aqueous system, it becomes difficult to graft a predetermined amount of the vinyl monomer.

The graft reaction can be carried out in any manner, e.g., a method of reacting by dissolving in a solvent, a method of reacting in suspension system, or a method of reacting in a molten state. The reaction in a molten state is one of the preferred methods. This method comprises heat melting a wax at a temperature of the melting point of the wax or higher and then adding the vinyl monomer and radical initiator to react. Another preferred method comprises suspending wax particles in a solvent, adding the vinyl monomer and the radical initiator, impregnating the vinyl monomer into the wax at a temperature at which the radical initiator does not decompose and increasing the temperature to complete the reaction.

The reaction temperature varies depending on the decomposition temperature of the radical initiator used, but the reaction is generally conducted at a temperature of from 50° C. to 150° C. and preferably 135° C. or less. If the reaction is conducted at a temperature exceeding 150° C. for a long period of time, side reactions such as thermal degradation of the resin occur remarkably. The reaction temperature need not to be constant throughout the reaction. The reaction time is generally about 0.2 to 8 hours. The reaction pressure is generally from atmospheric pressure to about 10 kg/cm$^2$.

The amine-modified wax thus produced is generally obtained as a mixture of the wax grafted with the tertiary amine unit-containing vinyl monomer, the ungrafted wax, and a polymer of the tertiary amine unit-containing vinyl monomer. The amine-modified wax which is fallen within the scope of this invention comprises 60 to 100% by weight of a wax, at least partially grafted with a tertiary amine unit-containing vinyl monomer, and 40 to 0% by weight of a polymer of the tertiary amine unit-containing vinyl monomer, the total amount of the tertiary amine unit-containing vinyl monomer in the composition being 0.3 to 40% by weight.

Therefore, the amine-modified wax obtained by fractionating and removing the polymer of tertiary amine unit-containing vinyl monomer from the modified wax obtained by the above methods; and the amine-modified wax obtained by diluting the wax highly graft-modified with a tertiary amine unit-containing vinyl monomer with the unmodified wax or the polymer of tertiary amine unit-modified vinyl monomer; and so on are fallen with the scope of this invention so long as the proportions of their components are satisfied with the above-described numerical ranges.

The amine-modified wax containing more than 40% by weight of the polymer of tertiary amine unit-containing vinyl monomer is undesirable because of lack of its homogeneity.

If the total amount of tertiary amine unit-containing vinyl monomer in the composition is less than 0.3% by weight, the compatibilizing effect is lost and the desired homogeneous composition cannot be obtained. If the amount thereof is more than 40% by weight, a homogeneous modified wax cannot be obtained.

A particularly preferred modified wax comprises 70 to 100% by weight of the wax, at least partially grafted with the tertiary amine unit-containing vinyl monomer, and 30 to 0% by weight of the polymer of the tertiary amine unit-containing vinyl monomer, the total content of the tertiary amine unit-containing vinyl monomer being from 0.3 to 30% by weight.

The following examples are to illustrate this invention in more detail but should by no means be construed as limiting the scope of the invention.

EXAMPLE 1

A 10 l autoclave was charged with 4.5 kg of a polyethylene wax (number average molecular weight $\overline{M}_N$: 1220, weight average molecular weight $\overline{M}_W$: 1550, $\overline{M}_W/\overline{M}_N$: 1.27, m.p.: 104.5° C., density: 0.935 g/cc) and the wax was melted at 120° C. with stirring. A solution of 224 g of 2-t-butylazo-2-cyanopropane dissolved in 500 g of dimethylaminoethyl methacrylate (10 wt% of the total amount including wax) was added dropwise over a period of 45 minutes. The mixture was allowed to stand at 120° C. for 15 minutes, followed by cooling, solidifying, pulverizing and drying to obtain 5 kg of a white modified wax.

The product thus obtained was fractionated by the solvent fractionation method. That is, a predetermined amount of the modified wax was thoroughly dissolved in toluene at 110° C. and after cooling, acetone was added thereto so as to give a toluene-to-acetone volume ratio of 1:4. After stirring, the mixture was filtered. In this procedure, the polymer synthesized from the amine unit-containing vinyl polymer was completely dissolved in the solvent and separated. The vinyl monomer content of this graft-modified wax fractionated (4.59 kg) as determined by the assay of nitrogen by microcoulometric titration was 2.0% by weight. The amount of the other fraction, the polymer of amine unit-containing vinyl monomer, was 410 g.

The modified wax prior to filtration was maintained in a remolten state at 130° C. for 5 minutes to observe the occurrence of phase separation due to secondary coagulation. As a result, phase separation was not observed at all and the product was a composition having an excellent homogeneity.

COMPARATIVE EXAMPLE 1

10 Parts by weight of the polymer of amine unit-containing vinyl monomer fractionated in Example 1 was simply blended with 90 parts by weight of the same polyethylene wax as used in Example 1 and the mixture was examined for phase separation. An apparent macroscopic phase separation was observed and a homogeneous composition could not be obtained.

EXAMPLE 2

10 Parts by weight of the graft-modified was fractionated in the course of preparation of the wax composition in Comparative Example 1 was blended with 100 parts by weight of the same composition. The resulting blend was observed for phase separation. As a result, phase separation was not observed at all.

EXAMPLE 3

The procedure of Example 1 was repeated except that 3.25 kg of polyethylene wax, 853 g of 2-t-butylazo-2-cyanopropane and 1.75 kg of dimethylaminoethyl methacrylate (35% by weight of the total amount including wax) were used to obtain 5 kg of a modified wax.

The phase separation phenomenon of this product due to remelting was observed in the same manner as in Example 1. As a result, this product did not show phase separation at all and had an excellent homogeneity.

The above product was further fractionated in the same manner as in Example 1. The vinyl monomer content in the graft-modified wax fractionated (3.62 kg) was 10.2% by weight. The amount of the other fraction, i.e., the polymer of amine unit-containing vinyl monomer, was 1.38 kg.

EXAMPLE 4

The reaction procedure of Example 1 was repeated except that 4.975 kg of polyethylene wax, 12.2 g of 2-t-butylazo-2-cyanopropane and 0.025 kg of dimethylaminoethyl methacrylate (0.5% by weight of the total amount including wax) were used to obtain 5 kg of a modified wax.

The phase separation phenomenon of this product due to remelting was observed in the same manner as in Example 1. As a result, the product did not show phase separation at all and had an excellent homogeneity.

This product was further fractionated in the same manner as in Example 1. The vinyl monomer content in the graft-modified wax fractionated (4.9913 kg) was 0.3% by weight and the amount of other fraction, the polymer of amine unit-containing vinyl monomer, was 8.7 g.

COMPARATIVE EXAMPLE 2

The reaction procedure of Example 1 was repeated except that 2.75 kg of polyethylene wax, 1.096 kg of 2-t-butylazo-2-cyanopropane and 2.25 kg of dimethylaminoethyl methacrylate (45% by weight of the total amount including wax) were used. With the progress of reaction, a brown polymer began to separate out.

The reaction product was further fractionated in the same manner as in Example 1. The vinyl monomer content in the graft-modified wax fractionated (3.02 kg) was 8.9% by weight. The amount of the other fraction, i.e., the polymer of the amine unit-containing vinyl monomer, was 1.98 kg. The total amount of amine unit-containing vinyl monomer in this product was 45% by weight.

COMPARATIVE EXAMPLE 3

94.9 Parts by weight of the same polyethylene wax as used in Example 1, 0.1 part by weight of the polymer of amine unit-containing vinyl monomer fractionated in Example 1, and 5 parts by weight of the graft-modified wax fraction also fractionated in Example 1 were blended together. The total content of amine unit-containing vinyl monomer was 0.2% by weight. The occurrence of phase separation of this composition was observed. As a result, an apparent macroscopic phase separation was observed and a homogeneous composition could not be obtained.

EXAMPLE 5

The reaction procedure of Example 1 was repeated except that 112 g of 2-t-butylazo-2-cyanopropane and 112 g of α-methylstyrene dimer were used as the radical initiator and chain transfer agent, respectively, to obtain 5 kg of a white modified wax. The phase separation phenomenon of this product due to remelting was observed in the same manner as in Example 1. As a result, this product did not show phase separation and had an excellent homogeneity.

The above product was further fractionated in the same manner as Example 1. The vinyl monomer content in the graft-modified wax fractionated (4.58 kg) was 1.7% by weight. The amount of the other fraction, i.e., a polymer of the amine unit-containing vinyl monomer, was 420 g.

While the invention has been described in detail and with reference to specific embodiments thereof, it will be apparent to one skilled in the art that various changes and modifications can be made therein without departing from the spirit and scope thereof.

What is claimed is:

1. An amine-modified homogeneous wax comprising 60–100% by weight of an unoxidized olefininc wax having a number average molecular weight of from 800 to 6,000 and a weight average molecular weight to number average molecular weight ratio of at least 1.05:1, being at least partially grafted with a tertiary amine unit-containing vinyl monomer selected from the group consisting of vinylpyridine, vinylpiperidine or a compound having the formula:

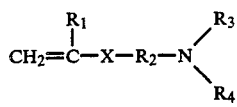

wherein $R_1$ is a hydrogen atom or a lower alkyl group, $R_2$ is a lower alkylene group, $R_3$ and $R_4$ each is a lower alkyl group or an aryl group, and X is a linking group to the unsaturated carbon atom; in the presence of a radical initiator which does not generate a carboxyl radical, and which is used in an amount of from 0.1 to 1.2 moles per mole of the vinyl monomer; and 0 to 40% by weight of a polymer of the tertiary amine unit-containing vinyl monomer, wherein the total amount of the tertiary amine unit-containing vinyl monomer in the composition is about 0.3 to 40% by weight.

2. An amine-modified homogeneous wax according to claim 1, comprising 70 to 100% by weight of the wax, at least partially grafted with tertiary amine unit-containing vinyl monomer, and 30 to 0% by weight of the polymer of tertiary amine unit-containing vinyl monomer, the total amount of the tertiary amine unit-containing vinyl monomer in the composition being 0.3 to 30% by weight.

3. An amine-modified homogeneous wax according to claim 1, wherein said unoxidized olefinic wax is a polyethylene wax.

4. An amine-modified homogeneous wax according to claim 3, wherein said polyethylene wax has a number average molecular weight of from 900 to 5,000.

5. An amine-modified homogeneous wax according to claim 1, wherein said weight-average molecular weight to number-average molecular weight ratio is at least 1.15:1.

6. An amine-modified homogeneous wax according to claim 1, wherein said radical initiator has a decomposition temperature of from 60° C. to 100° C., whereby the decomposition percentage of radical initiator reaches 50% when 0.1 mole of the radical initiator is added to one liter of benzene and the mixture is allowed to stand at a given temperature for 10 hours.

7. An amine-modified homogeneous wax according to claim 6, wherein said radical initiator is an organic peroxide or an azo compound having a decomposition temperature of from 60° C. to 100° C.

8. An amine-modified homogeneous wax according to claim 6, wherein said radical initiator is an azo compound.

9. An amine-modified homogeneous wax according to claim 1, wherein said radical initiator is used in an amount of from 0.15 mole to 0.9 moles per mole of the vinyl monomer.

10. An amine-modified homogeneous wax according to claim 1, wherein said linking group is a direct bond or an amide group.

11. An amine-modified homogeneous wax comprising 60 to 100% by weight of an unoxidized olefinic wax having a number average molecular weight of from 800–6,000 and a weight average molecular weight to number average molecular weight ratio of at least 1.05:1, and wherein the total amount of the tertiary amine unit-containing vinyl monomer in the composition is about 0.3 to 40% by weight, and which is prepared by a process consisting essentially of radically grafting to said polyethylene wax a tertiary amine unit-containing vinyl monomer selected from the group consisting of vinylpyridine, vinylpiperidine or a compound having the formula:

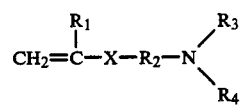

wherein $R_1$ is a hydrogen atom or a lower alkyl group, $R_2$ is a lower alkylene group, $R_3$ and $R_4$ each is a lower alkyl group or an aryl group, and X is a linking group to the unsaturated carbon atom; in the presence of a radical initiator which does not generate a carboxyl radical, and which is used in an amount of from 0.1 to 1.2 moles per mole of the vinyl monomer.

12. An amine-modified homogeneous wax according to claim 11, wherein during said radical grafting, said vinyl monomer is fed at a rate of $2 \times 10^{-3}$ to $5 \times 10^2$ moles/hr per kg of said wax and the radical initiator is fed at a rate of $2 \times 10^{-4}$ to $5 \times 10^2$ moles/hr per kg of said wax.

13. An amine-modified homogeneous wax according to claim 11, wherein said radical grafting reaction is conducted in a non-aqueous system.

14. An amine-modified homogeneous wax according to claim 11, which further contains up to 40% by weight of a polymer of the tertiary amine unit-containing vinyl monomer.

15. An amine-modified homogeneous wax according to claim 11, wherein said radical initiator has a decomposition temperature in the range of 60°–120° C.

* * * * *